US008892723B2

(12) United States Patent
Jibbe et al.

(10) Patent No.: US 8,892,723 B2
(45) Date of Patent: Nov. 18, 2014

(54) METHOD AND APPARATUS FOR ENABLING COMMUNICATION BETWEEN ISCSI DEVICES AND SAS DEVICES

(75) Inventors: Mahmoud K. Jibbe, Wichita, KS (US); Dhishankar Sengupta, Bangalore (IN); Madhukar Gunjan, Bangalore (IN); Krishanu Dhar, Bangalore (IN)

(73) Assignee: Netapp, Inc., Sunnyvale, CA (US)

( * ) Notice: Subject to any disclaimer, the term of this patent is extended or adjusted under 35 U.S.C. 154(b) by 855 days.

(21) Appl. No.: 12/816,391

(22) Filed: Jun. 16, 2010

(65) Prior Publication Data

US 2011/0314141 A1 Dec. 22, 2011

(51) Int. Cl.
*G06F 15/173* (2006.01)
*H04L 29/12* (2006.01)
*H04L 29/08* (2006.01)
*H04L 29/06* (2006.01)
*G06F 3/06* (2006.01)

(52) U.S. Cl.
CPC ........ *H04L 61/2038* (2013.01); *H04L 67/1097* (2013.01); *H04L 69/08* (2013.01); *G06F 3/0607* (2013.01); *G06F 3/0661* (2013.01); *G06F 3/0689* (2013.01); *H04L 61/106* (2013.01)
USPC ...................................................... 709/224

(58) Field of Classification Search
CPC ... H04L 67/1097; H04L 69/08; H04L 61/106; H04L 61/2038; G06F 3/0607; G06F 3/0689; G06F 3/0661
USPC ........................................................ 709/224
See application file for complete search history.

(56) References Cited

U.S. PATENT DOCUMENTS

| | | | | |
|---|---|---|---|---|
| 6,760,769 B2* | 7/2004 | Jayam et al. | | 709/228 |
| 7,165,258 B1 | 1/2007 | Kuik et al. | | |
| 7,206,860 B2* | 4/2007 | Murakami et al. | | 709/238 |
| 7,249,173 B2* | 7/2007 | Nicolson | | 709/223 |
| 7,333,484 B2* | 2/2008 | Henderson et al. | | 370/389 |
| 7,437,477 B2 | 10/2008 | Kuik et al. | | |
| 7,516,214 B2* | 4/2009 | Gandhi | | 709/224 |
| 7,539,799 B2* | 5/2009 | Ashmore et al. | | 710/74 |
| 7,558,264 B1* | 7/2009 | Lolayekar et al. | | 370/392 |
| 7,770,059 B1* | 8/2010 | Glade et al. | | 714/6.32 |
| 7,818,455 B2* | 10/2010 | Haffner | | 709/245 |
| 7,958,385 B1* | 6/2011 | Frangioso et al. | | 714/4.1 |
| 8,082,362 B1* | 12/2011 | Ewing | | 709/238 |
| 8,095,820 B2* | 1/2012 | Douchi et al. | | 714/6.13 |
| 8,112,513 B2* | 2/2012 | Margulis | | 709/224 |

(Continued)

OTHER PUBLICATIONS

US 7,366,791, 04/29/2008, (withdrawn).

(Continued)

*Primary Examiner* — Rupal Dharia
*Assistant Examiner* — Marcus McKenzie
(74) *Attorney, Agent, or Firm* — Haynes and Boone, LLP

(57) ABSTRACT

A method and apparatus for enabling communication between iSCSI/SAS host devices and iSCSI/SAS target devices via an iSCSI/SAS router is disclosed. In one embodiment, an iSCSI/SAS router includes iSCSI interfaces, SAS interfaces, and a mapping and routing logic. The mapping and routing logic is coupled to the iSCSI interfaces and the SAS interfaces. The mapping and routing logic virtualizes one or more SAS host and target devices to communicate with discovered one or more iSCSI host and target devices. Further, the mapping and routing logic virtualizes the one or more iSCSI host and target devices to communicate with discovered one or more SAS host and target devices.

15 Claims, 4 Drawing Sheets

(56) References Cited

U.S. PATENT DOCUMENTS

| | | | |
|---|---|---|---|
| 8,694,723 B2* | 4/2014 | Chakhaiyar et al. | 711/114 |
| 2004/0010612 A1* | 1/2004 | Pandya | 709/230 |
| 2004/0054776 A1* | 3/2004 | Klotz et al. | 709/224 |
| 2004/0083285 A1* | 4/2004 | Nicolson | 709/224 |
| 2004/0083308 A1* | 4/2004 | Sebastian et al. | 709/248 |
| 2005/0076113 A1* | 4/2005 | Klotz et al. | 709/224 |
| 2005/0160251 A1* | 7/2005 | Zur et al. | 712/1 |
| 2005/0267986 A1* | 12/2005 | Murakami et al. | 709/238 |
| 2006/0031468 A1* | 2/2006 | Atluri et al. | 709/224 |
| 2006/0080416 A1* | 4/2006 | Gandhi | 709/220 |
| 2006/0143322 A1* | 6/2006 | Hoese et al. | 710/8 |
| 2006/0174071 A1* | 8/2006 | Justiss et al. | 711/154 |
| 2006/0248292 A1* | 11/2006 | Suresh | 711/154 |
| 2007/0112931 A1 | 5/2007 | Kuik et al. | |
| 2007/0130373 A1* | 6/2007 | Kalwitz | 710/8 |
| 2007/0156926 A1* | 7/2007 | Burgess et al. | 709/249 |
| 2007/0174470 A1* | 7/2007 | Burgess et al. | 709/227 |
| 2007/0288568 A1* | 12/2007 | Hayter | 709/204 |
| 2008/0030744 A1 | 2/2008 | Beardsley | |
| 2008/0307444 A1* | 12/2008 | Hoese et al. | 719/326 |
| 2011/0231901 A1* | 9/2011 | Nakamura et al. | 726/3 |
| 2011/0314141 A1* | 12/2011 | Jibbe et al. | 709/224 |
| 2012/0059991 A1* | 3/2012 | Cuddihy et al. | 711/114 |

OTHER PUBLICATIONS

International Searching Authority—United States, PCT Notification of Transmittal of the International Search Report and the Written Opinion of the International Searching Authority, or the Declaration mailed Oct. 5, 2011, PCT Appl. No. PCT/US2011/040332, 8 pages Alexandria, VA.

* cited by examiner

METHOD AND APPARATUS FOR ENABLING COMMUNICATION BETWEEN ISCSI DEVICES AND SAS DEVICES

BACKGROUND

As electronic business (e-business) grows, so does the need of better ways to share and manage large amounts of data. The amount of data storage required by today's e-businesses is staggering. Today almost all client access to large scale storage is accomplished by sending request through internet small computer system interface (iSCSI) based devices that connect an internet protocol (IP) network, example a local area network (LAN) or a wide area network (WAN), to storage network, example a storage area network (SAN).

However, serial attached SCSI (SAS) is an emerging industry standard as the enterprise-class standard storage interface. A typical SAS domain comprises SAS devices (e.g., host devices or initiators and target devices) interconnected with a set of point-to-point-links. For example, SAS can support up to 16,384 addressable devices in the SAS domain and point-to-point data transfer speeds up to 6 Gbit/s. In the SAS domain, the SAS devices use SAS commands for interacting with other SAS devices.

Another standard used for exchanging data between a host device and a target device using SCSI commands is iSCSI standard. iSCSI is a TCP/IP based protocol that carries the SCSI commands over an IP network to enable communication between iSCSI host and target devices. An advantage of iSCSI standard is that the iSCSI enables the iSCSI host and target devices to communicate with each other with no limitation to distance between them. Unlike the iSCSI, the SAS enables the SAS host and target devices to communicate with each other with limited operating distances. Currently, the SAS devices can span up to a range of about 6-7 meters. As a result, the SAS devices are mostly restricted to point-to-point connectivity and hence operate within limited operating distances.

Today, almost all backend storage devices are SAS devices or drives. The SAS devices are made part of the SAN through controllers which act as the SAN interface to the SAS devices. The SAS devices do not have any iSAN interface. Also currently, there are no SAS to iSCSI converters available for enabling the traffic between SAS devices and iSCSI devices.

SUMMARY

This summary is provided to comply with 37 C.F.R. §1.73, requiring a summary of the invention briefly indicating the nature and substance of the invention. It is submitted with the understanding that it will not be used to interpret or limit the scope or meaning of the claims.

A method and apparatus for enabling communication between iSCSI devices and SAS devices is disclosed. In one aspect, an iSCSI/SAS router includes a plurality of iSCSI interfaces, a plurality of SAS interfaces, and a mapping and routing logic coupled to the plurality of iSCSI interfaces and the plurality of SAS interfaces. The mapping and routing logic virtualizes one or more SAS host and target devices to communicate with discovered one or more iSCSI host and target devices. Further, the mapping and routing logic virtualizes the one or more iSCSI host and target devices to communicate with discovered one or more SAS host and target devices.

In another aspect, in a method for enabling communication between iSCSI/SAS host devices and iSCSI/SAS target devices via an iSCSI/SAS router, one or more SAS host and target devices are virtualized to communicate with discovered one or more iSCSI host and target devices. Further, the one or more iSCSI host and target devices are virtualized to communicate with discovered one or more SAS host and target devices.

In yet another aspect, a system for enabling communication between iSCSI/SAS host devices and iSCSI/SAS target devices includes one or more iSCSI host and target devices, one or more SAS host and target devices, a TCP/IP network, and an iSCSI/SAS router. The iSCSI/SAS router is coupled to the one or more iSCSI host and target devices via the TCP/IP network and further coupled to the one or more SAS host and target devices.

The iSCSI/SAS router includes a plurality of iSCSI interfaces, a plurality of SAS interfaces, and a mapping and routing logic coupled to the plurality of iSCSI interfaces and the plurality of SAS interfaces. The mapping and routing logic virtualizes one or more SAS host and target devices to communicate with discovered one or more iSCSI host and target devices. Further, the mapping and routing logic virtualizes the one or more iSCSI host and target devices to communicate with discovered one or more SAS host and target devices.

Other features of the embodiments will be apparent from the accompanying drawings and from the detailed description that follows.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A method and apparatus for enabling communication between iSCSI devices and SAS devices is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Figure 1:
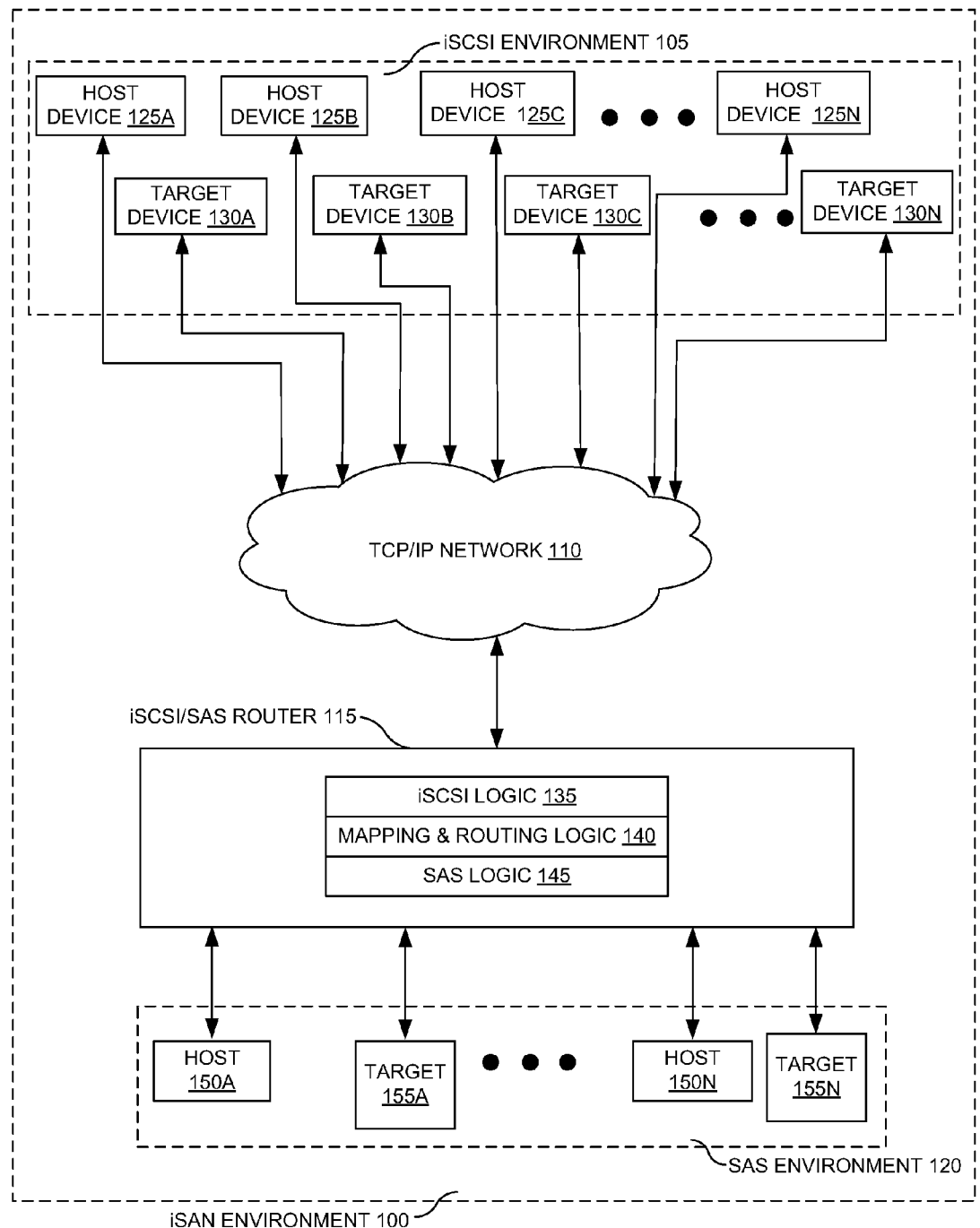
FIG. 1 illustrates a block diagram of an exemplary iSAN environment, according to one embodiment.

FIG. 1 illustrates a block diagram of an exemplary iSAN environment 100, according to one embodiment. As illustrated, the iSAN environment 100 includes SAS host devices 150A-N and target devices 155A-N in a SAS environment 120 directly coupled to an iSCSI/SAS router 115. Also, the iSAN environment 100 includes iSCSI host devices 125A-N and target devices 130A-N in an iSCSI environment 105 coupled to the iSCSI/SAS router 115 via a transfer control protocol/internet protocol (TCP/IP) network 110.

In one embodiment, the iSCSI/SAS router 115 enables communication between the SAS host devices 150A-N and target devices 155A-N or the iSCSI target devices 130A-N. For example, the communication between the SAS host devices 150A-N and the iSCSI target devices 130A-N may include receiving SAS commands from the SAS host devices 150A-N, converting the SAS commands to TCP packets and transmitting the TCP packets to the iSCSI target devices 130A-N. It is appreciated that, the communication between the SAS host devices 150A-N and SAS target devices 155A-N may include receiving SAS commands from the SAS host devices 150A-N, and transmitting the SAS commands to the SAS target devices 155A-N.

In another embodiment, the iSCSI/SAS router 115 enables communication between the iSCSI host devices 125A-N and the iSCSI target devices 130A-N or the SAS target devices 155A-N. For example, the communication between the iSCSI host devices 125A-N and the SAS target devices 155A-N may include receiving TCP packets from the iSCSI host devices 125A-N, converting the TCP packets to SAS commands, and transmitting the SAS commands to the SAS target devices 155A-N. It is appreciated that, the communication between the iSCSI host devices 125A-N and the iSCSI target devices 130A-N may include receiving TCP packets from the iSCSI host devices 125A-N, and transmitting the TCP packets to the iSCSI target devices 130A-N.

As illustrated, the iSCSI/SAS router 115 includes an iSCSi logic 135, a mapping and routing logic 140, and a SAS logic 145 to perform the above-mentioned functionality. The iSCSI/SAS router 115 is explained in greater detail with respect to FIG. 2.

Figure 2:
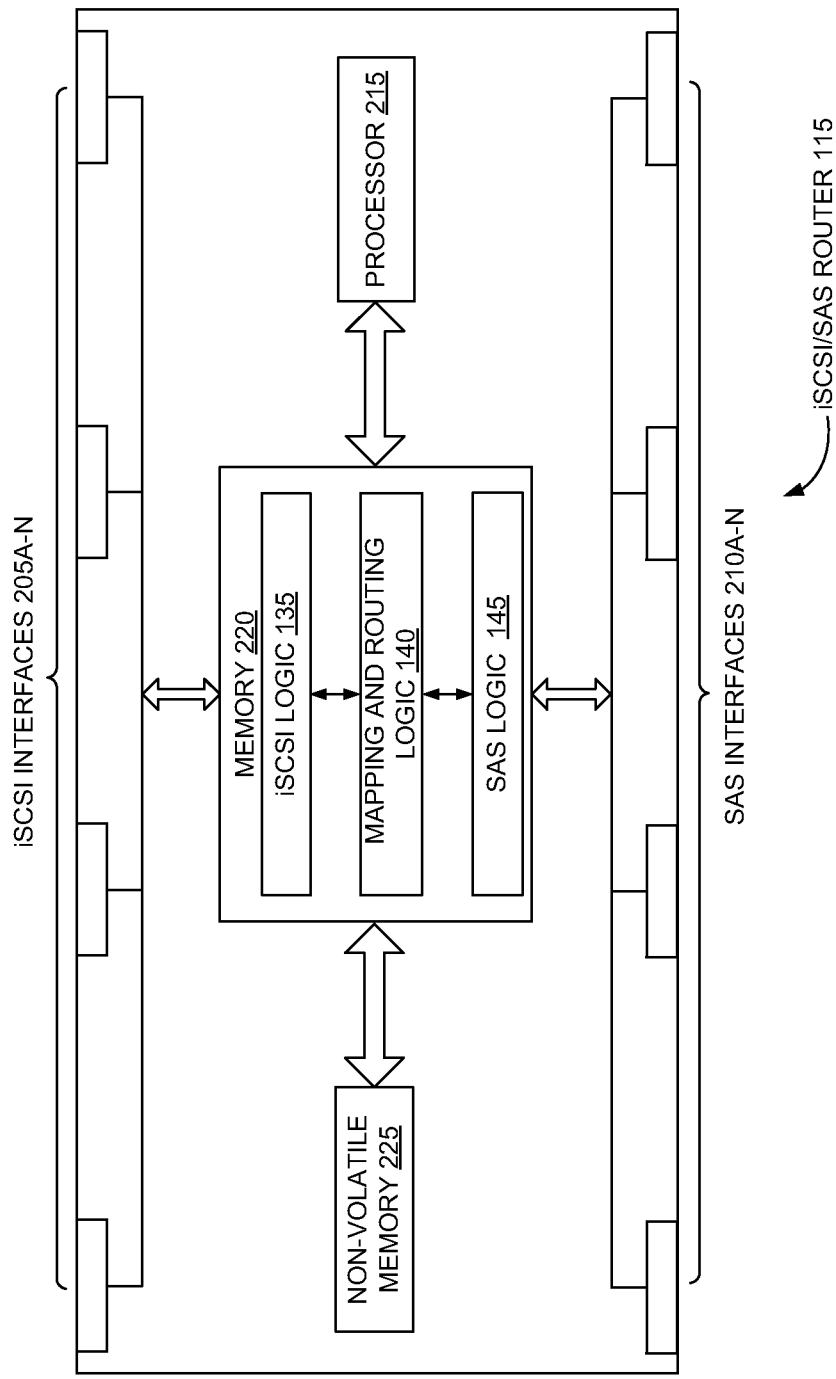
FIG. 2 illustrates major components of the iSCSI/SAS router of FIG. 1, according to one embodiment.

FIG. 2 illustrates major components of the iSCSI/SAS router 115 of FIG. 1, according to one embodiment. As illustrated, the iSCSI/SAS router 115 includes a plurality of iSCSI interfaces 205A-N (e.g., Ethernet ports or RJ45 ports) for coupling the iSCSI host devices 125A-N and/or target devices 130A-N via the TCP/IP network 110, where each iSCSI interface 205 is assigned an iSCSI qualified number (iqn). The iSCSI/SAS router 115 also includes a plurality of SAS interfaces 210A-N (e.g., wide/narrow ports) for directly connecting the SAS host devices 150A-N and/or target devices 155A-N, where each SAS interface 210 is assigned a SAS physical ID. The iSCSI/SAS router 115 further includes a processor 215 and a memory 220 coupled to the processor 215. The memory 220 includes the iSCSi logic 135, the mapping and routing logic 140 and the SAS logic 145.

In operation, when the iSCSI/SAS router 115 is powered on, the iSCSI logic 135 discovers the iSCSI host devices 125A-N and target devices 130A-N connected to the iSCSI interfaces 205A-N to obtain associated iSCSI IDs. The iSCSi logic 135 then generates a table including a list of iSCSI IDs of the discovered iSCSI host devices 125A-N and target devices 130A-N and stores the table in a non-volatile memory 225. Similarly, on power-up, the SAS logic 145 discovers the SAS host devices 150A-N and target devices 155A-N connected to the SAS interfaces 210A-N (by issuing COMSAS commands) to obtain associated SAS physical IDs. It is appreciated that, the SAS logic 145 discovers the SAS host devices 150A-N and target devices 155A-N based on SAS protocol. The SAS logic 145 then generates a table including a list of SAS physical IDs of the discovered SAS host devices 150A-N and target devices 155A-N and stores the table in the non-volatile memory 225.

The mapping and routing logic 140 assigns virtual iSCSI IDs to the SAS physical IDs of the discovered SAS host devices 150A-N and target devices 155A-N. Further, the mapping and routing logic 140 assigns virtual SAS physical IDs to the iSCSI IDs of the discovered iSCSI host devices 125A-N and target devices 130A-N. Then, the mapping and routing logic 140 generates a mapping and routing table having a list of the iSCSI IDs mapped to the virtual SAS physical IDs and the SAS physical IDs mapped to the virtual iSCSI IDs. Further, the mapping and routing table is stored in the non-volatile memory 225 of the iSCSI/SAS router 115. It should be noted that the tables in the non-volatile memory 225 get updated dynamically as and when SAS host and target devices and iSCSI host and target devices are added or removed from the iSAN environment 100.

Thus, the mapping and routing logic 140 coupled to the plurality of iSCSI interfaces 205A-N and the plurality of SAS interfaces 210A-N virtualizes the SAS host devices 150A-N and target devices 155A-N to communicate with the discovered iSCSI host devices 125A-N and target devices 130A-N. Further, the mapping and routing logic 140 virtualizes the iSCSI host devices 125A-N and target devices 130A-N to communicate with the discovered SAS host devices 150A-N and target devices 155A-N.

The mapping and routing logic 140 also routes frames from a host device (e.g., an iSCSI host device or a SAS host device) to a requested target device (e.g., an iSCSI target device or a SAS target device) and responses from the target device to the host device. In one embodiment, the mapping and routing logic 140 is configured to convert frames (e.g., from TCP packets to SAS commands or SAS commands to TCP packets) and responses (e.g., a SAS response to a TCP packet) when either the iSCSI host devices 125A-N are communicating with the SAS target devices 155A-N or SAS host devices 150A-N are communicating with the iSCSI target devices 130A-N.

It can be noted that, the iSCSi logic 135, the mapping and routing logic 140 and the SAS logic 145 may be in a form of instructions stored in the memory 220. These instructions in the memory 220, when executed by the processor 215, causes the processor 215 to perform a method described in FIG. 3 and FIG. 4.

Figure 3:
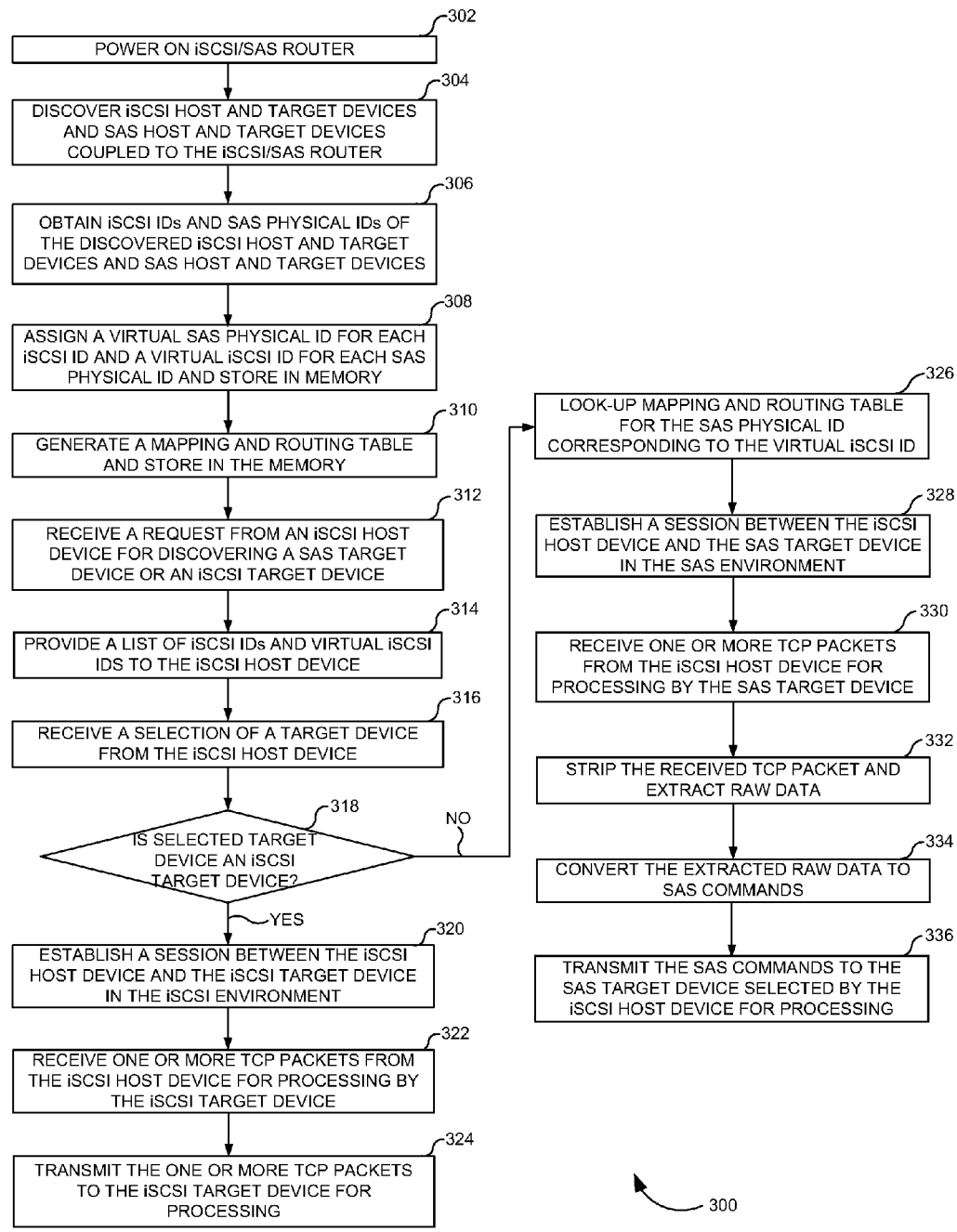
FIG. 3 illustrates a process flowchart of an exemplary method of enabling communication between an iSCSI host device and a target device, according to one embodiment.

FIG. 3 illustrates a process flowchart of an exemplary method 300 of enabling communication between an iSCSI host device and a target device (e.g., an iSCSI target device or a SAS target device), according to one embodiment. At step 302, an iSCSI/SAS router (e.g., the iSCSI/SAS router 115 of FIG. 1) coupled to iSCSI host devices and/or target devices and SAS host devices and/or target devices, is powered on. At step 304, the iSCSI host devices and/or target devices, and the SAS host devices and/or target devices coupled to the iSCSI/SAS router are discovered using an iSCSI logic and a SAS logic respectively.

For example, the iSCSI host and target devices are connected to the iSCSI/SAS router via a plurality of iSCSI interfaces over a TCP/IP network. Further, the SAS host and target devices are connected to the iSCSI/SAS router via a plurality of SAS interfaces. At step 306, an iSCSI ID (e.g., iqn) associated with each of the discovered iSCSI host and target devices is obtained. Further, at step 306, a SAS physical ID associated with each of the discovered SAS host and target devices is obtained.

At step 308, a virtual SAS physical ID is assigned for each of the iSCSI IDs of the discovered iSCSI host devices and/or target devices. In one example embodiment, the virtual SAS physical IDs and corresponding iSCSI IDs are stored as a table in memory of the ISCSI/SAS router. Also, at step 308, a virtual iSCSI ID is assigned for each of the SAS physical IDs of the discovered SAS host devices and/or target devices. In one example embodiment, the virtual iSCSI IDs and corresponding SAS physical IDs are stored as a table in the memory.

At step 310, a mapping and routing table is generated and stored in the memory. In one example embodiment, the mapping and routing table is generated by mapping the iSCSI IDs to corresponding virtual SAS physical IDs and mapping the SAS physical IDs to corresponding virtual iSCSI IDs. The mapping and routing table is dynamically updated when an iSCSI host or target device(s) and/or a SAS host or target device(s) are added or removed from the iSCSI/SAS router. At step 312, a request is received from the iSCSI host device for discovering a SAS target device or an iSCSI target device. At step 314, a list of iSCSI IDs associated with the iSCSI target devices and virtual iSCSI IDs associated with the SAS target devices is provided to the iSCSI host device.

At step 316, a selection of a target device is received from the iSCSI host device based on the list of iSCSI IDs and virtual iSCSI IDs. At step 318, it is determined whether the selected target device is an iSCSI target device. In one embodiment, the iSCSI ID associated with the selected target device is matched with the iSCSI IDs and the virtual iSCSI IDs stored in the memory. The selected target device may be confirmed as an iSCSI target device if the iSCSI ID associated with the selected target device matches with the iSCSI IDs stored in the memory. Thus, if the determination at step 318 is true, the method 300 performs steps 320-324.

In operation 320, a session is established between the iSCSI host device and the selected iSCSI target device in an iSCSI environment based on the iSCSI ID of the selected iSCSI target device. In one embodiment, during the process of establishing the session, the iSCSI host device negotiates various parameters, supported features and authentication details with the iSCSI target device.

Once the session is established, one or more TCP packets are received by the iSCSI/SAS router from the iSCSI host device for processing by the iSCSI target device at step 322. In operation 324, the one or more TCP packets are transmitted by the iSCSI/SAS router to the iSCSI target device for processing. In one example embodiment, the iSCSI/SAS router strips iSCSI packet data unit (PDU) from each TCP packet and then transmits the iSCSI PDU to the iSCSI target device.

If the determination at step 318 is false, the method 300 performs operations 326-336. At step 326, the mapping and routing table is looked up for a SAS physical ID corresponding to a virtual iSCSI ID associated with the selected SAS target device. At step 328, a session is established between the iSCSI host device and the SAS target device in the SAS environment based on the identified SAS physical ID of the SAS target device. In one embodiment, during the process of establishing the session, the iSCSI host device negotiates various parameters, supported features and authentication details with the SAS target device.

Once the session is established, one or more TCP packets are received by the iSCSI/SAS router from the iSCSI host device for processing by the SAS target device at step 330. At step 332, each of the received TCP packets is stripped and raw data is extracted from an iSCSI PDU of each TCP packet by the iSCSI/SAS router. At step 334, the extracted raw data is converted to SAS commands by the iSCSI/SAS router. At step 336, the SAS commands are transmitted to the SAS target device for processing.

Further, during the session, the SAS target device sends a SAS response to the iSCSI host device via the iSCSI/SAS router. The iSCSI/SAS router then strips the SAS response and extracts raw data from the SAS response. The iSCSI/SAS router then converts the extracted raw data to an iSCSI PDU. Then, the iSCSI/SAS router encapsulates the iSCSI PDU in a TCP packet and sends the TCP packet to the iSCSI host device.

Figure 4:
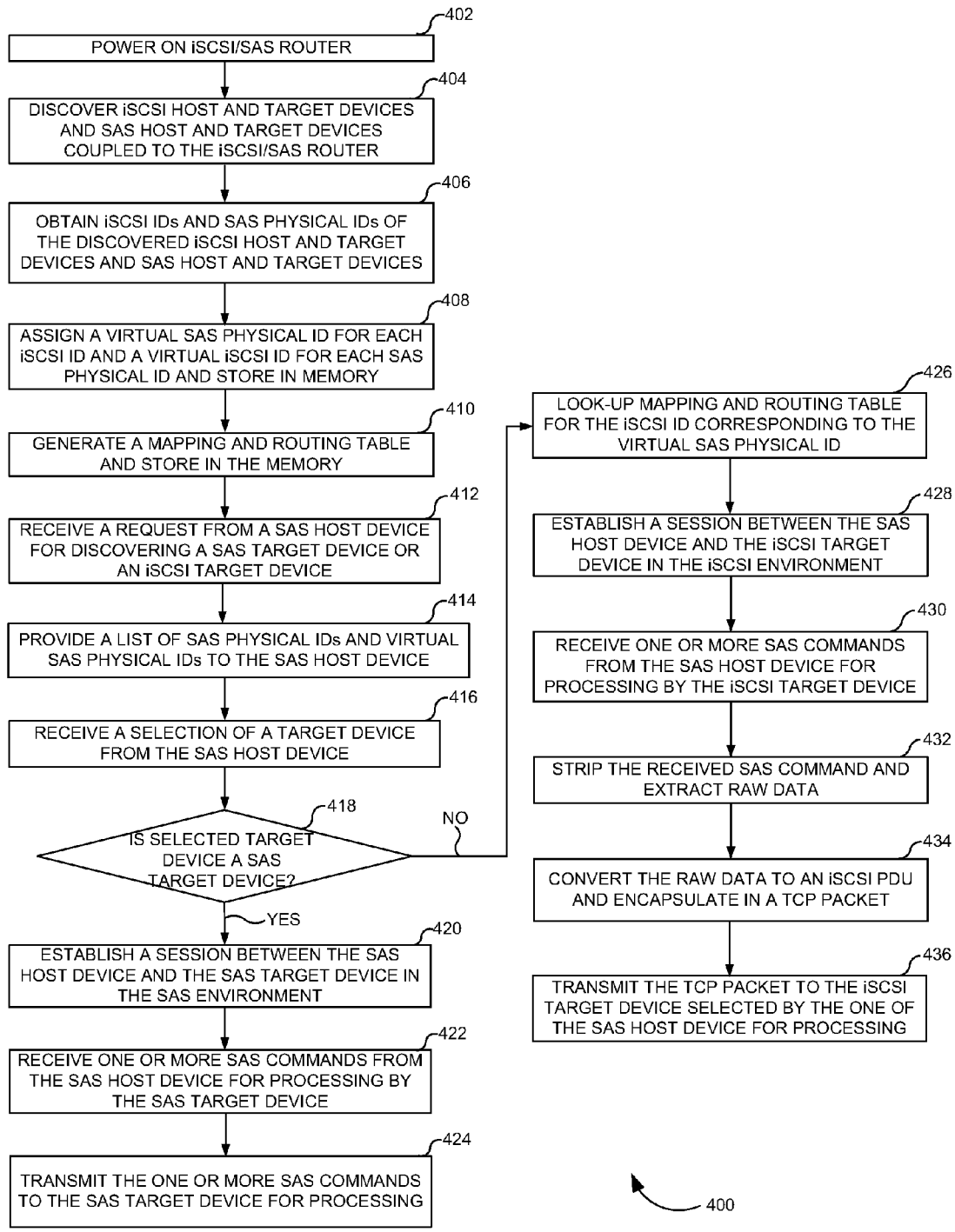
FIG. 4 illustrates a process flowchart of an exemplary method of enabling communication between a SAS host device and a target device, according to one embodiment.

FIG. 4 illustrates a process flowchart of an exemplary method 400 of enabling communication between a SAS host device and a target device (e.g., an iSCSI target device or a SAS target device), according to one embodiment. At step 402, an iSCSI/SAS router (e.g., the iSCSI/SAS router 115 of FIG. 1) coupled to iSCSI host devices and/or target devices and SAS host devices and/or target devices, is powered on. At step 404, the iSCSI host devices and/or target devices, and the SAS host devices and/or target devices coupled to the iSCSI/SAS router are discovered using an iSCSI logic and a SAS logic respectively.

For example, the iSCSI host and target devices are connected to the iSCSI/SAS router via a plurality of iSCSI interfaces over a TCP/IP network. Further, the SAS host and target devices are connected to the iSCSI/SAS router via a plurality of SAS interfaces. At step 406, an iSCSI ID (e.g., iqn) associated with each of the discovered iSCSI host and target devices is obtained. Further, at step 406, a SAS physical ID associated with each of the discovered SAS host and target devices is obtained.

At step 408, a virtual SAS physical ID is assigned for each of the iSCSI IDs of the discovered iSCSI host devices and/or target devices. In one example embodiment, the virtual SAS physical IDs and the corresponding iSCSI IDs are stored as a table in memory of the ISCSI/SAS router. Also, at step 408, a virtual iSCSI ID is assigned for each of the SAS physical IDs of the discovered SAS host devices and/or target devices. In one example embodiment, the virtual iSCSI IDs and the corresponding SAS physical IDs are stored as a table in the memory.

At step 410, a mapping and routing table is generated and stored in the memory. In one example embodiment, the mapping and routing table is generated by mapping the iSCSI IDs to the corresponding virtual SAS physical IDs and mapping the SAS physical IDs to the corresponding virtual iSCSI IDs. The mapping and routing table is dynamically updated when an iSCSI host or target device(s) and/or SAS host or target device(s) are added or removed from the iSCSI/SAS router.

At step 412, a request is received from a SAS host device for discovering an iSCSI target device or a SAS target device. At step 414, a list of SAS physical IDs associated with the SAS target devices and the virtual SAS physical IDs associated with the iSCSI target devices is provided to the SAS host device. At step 416, a selection of a target device is received from the SAS host device based on the list of SAS physical IDs and virtual SAS physical IDs. At step 418, it is determined whether the target device selected by the SAS host device is a SAS target device based on the virtual SAS physical IDs and the SAS physical IDs. If the target device selected is a SAS target device, then the method 400 performs steps 420-424.

At step 420, a session is established between the SAS host device and the selected SAS target device in a SAS environment. At step 422, once the session is established, one or more SAS commands from the SAS host device are received for processing by the selected SAS target device. At step 424, the one or more SAS commands, received from the SAS host device, are transmitted to the selected SAS target device using associated SAS physical ID.

If the determination at step 418 is false, the method 400 performs operations 426-436. At step 426, the mapping and routing table is looked up for an iSCSI ID corresponding to the virtual SAS physical ID associated with the selected iSCSI target device. Once the corresponding iSCSI ID is found, step 428 is performed, wherein a session is established between the SAS host device and the iSCSI target device in an iSCSI environment. During the process of establishing the session, the SAS host device negotiates various parameters, supported features, speed and authentication with a SAS expander of the iSCSI/SAS router.

Once the session is established at step 428, then at step 430, one or more SAS commands are received from the SAS host device. At step 432, the one or more SAS commands are stripped, and raw data is extracted from each SAS command. At step 434, the extracted raw data is converted to an iSCSI PDU and the iSCSI PDU is encapsulated in a TCP packet. At step 436, the TCP packet is transmitted to the iSCSI target device selected by the SAS host device for processing.

Further, during the session, the iSCSI target device may send an iSCSI response to the SAS host device via the iSCSI/SAS router. The iSCSI/SAS router then strips the iSCSI response and extracts raw data from the iSCSI response. Further, the iSCSI/SAS router converts the extracted raw data to SAS commands. Then, the iSCSI/SAS router sends the SAS commands to the SAS host device.

In various embodiments, the apparatus and methods described in FIGS. 1 through 4 enables SAS devices to be a part of the iSCSI network. The above-described apparatus and methods provide iSAN interfaces to both SAS host and target devices. Further, the distance limitation for SAS devices gets eliminated in the iSAN environment. The above-described apparatus and methods may offer significant benefits in enterprise IT environments, including reduced power consumption, increased performance, efficient use of enterprise resources, and reduced total cost of ownership.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. An iSCSI/SAS router, comprising:
    a plurality of iSCSI interfaces;
    a plurality of SAS interfaces, wherein the iSCSI/SAS router is operable to receive via the plurality of SAS interfaces a request from a SAS host device for discovering one or more iSCSI target devices connected to the iSCSI interfaces;
    a iSCSI logic stored on memory;
    the iSCSI logic executed by a processor to discover the one or more iSCSI target devices connected to the plurality of iSCSI interfaces, wherein the iSCSI/SAS router is operable to provide to the SAS host device via the plurality of SAS interfaces a list of virtual SAS physical IDs of the discovered one or more iSCSI target devices, and wherein the iSCSI/SAS router is operable to receive via the plurality of SAS interfaces from the SAS host device a selection of an iSCSI target device from the list; and
    a mapping and routing logic coupled to the plurality of iSCSI interfaces and the plurality of SAS interfaces for converting frames received from the SAS host device via the plurality of SAS interfaces and routing the converted frames received from the SAS host device to the iSCSI target device via the plurality of iSCSI interfaces, and for converting frames received from the iSCSI target device via the plurality of iSCSI interfaces and routing the converted frames received from the iSCSI target device to the SAS host device via the plurality of SAS interfaces;
    wherein the mapping and routing logic assigns a virtual SAS physical ID to a iSCSI ID of the iSCSI target device and generates a mapping and routing table having the iSCSI ID of the iSCSI target device mapped to the virtual SAS physical ID to enable communication between the SAS host device and the iSCSI target device.

2. The iSCSI/SAS router of claim 1, further comprising memory for storing the mapping and routing table.

3. The iSCSI/SAS router of claim 1, wherein the plurality of iSCSI interfaces comprises RJ-45 ports or Ethernet ports.

4. The iSCSI/SAS router of claim 1, wherein the plurality of SAS interfaces comprises wide/narrow ports.

5. A method for enabling communication between iSCSI/SAS host devices and iSCSI/SAS target devices via an iSCSI/SAS router, comprising:
    receiving a request from a SAS host device for discovering one or more iSCSI target devices connected to the iSCSI/SAS router;
    discovering the one or more iSCSI target devices connected to the iSCSI/SAS router;
    providing to the SAS host device a list of virtual SAS physical IDs of the discovered one or more iSCSI target devices;
    receiving from the SAS host device a selection of an iSCSI target device from the list;
    assigning a virtual SAS physical ID to a iSCSI ID of the iSCSI target device;
    generating a mapping and routing table having the iSCSI ID of the iSCSI target device mapped to the virtual SAS physical ID to enable communication between the SAS host device and the iSCSI target device;
    converting frames received from the SAS host device to a format suitable for transmission to the iSCSI target device;
    transmitting the converted frames received from the SAS host device to the iSCSI target device;
    converting frames received from the iSCSI target device to a format suitable for transmission to the SAS host device; and
    transmitting the converted frames received from the iSCSI target device to the SAS host device.

6. The method of claim 5, further comprising storing the mapping and routing table in memory of the iSCSI/SAS router.

7. A system, comprising:
    an iSCSI/SAS router coupled to one or more iSCSI host and target devices via a TCP/IP network and further coupled to one or more SAS host and target devices, wherein the iSCSI/SAS router comprises:
        a plurality of iSCSI interfaces and a plurality of SAS interfaces, wherein the iSCSI/SAS router is operable to receive via the plurality of iSCSI interfaces a request from a iSCSI host device for discovering one or more SAS target devices connected to the SAS interfaces;
        a SAS logic stored on memory;
        the SAS logic executed by a processor to discover the one or more SAS target devices connected to the plurality of SAS interfaces, wherein the iSCSI/SAS router is operable to provide to the iSCSI host device via the plurality of iSCSI interfaces a list of virtual iSCSI physical IDs of the discovered one or more SAS target devices, and wherein the iSCSI/SAS router is operable to receive via the plurality of iSCSI interfaces from the iSCSI host device a selection of an SAS target device from the list; and a mapping and routing logic coupled to the plurality of iSCSI interfaces and the plurality of SAS interfaces for converting frames received from the iSCSI host device via the plurality of iSCSI interfaces and routing the converted frames received from the iSCSI host device to the SAS target device, and for converting frames received from the SAS target device via the plurality of SAS interfaces and routing the converted frames received from the SAS target device to the iSCSI host device via the plurality of iSCSI interfaces, wherein the mapping and routing logic assigns a virtual iSCSI physical ID to a SAS ID of the SAS target device and generates a mapping and routing table having the SAS ID of the SAS target device mapped to the virtual iSCSI physical ID to enable communication between the iSCSI host device and the SAS target device.

8. The system of claim 7, further comprising memory for storing the mapping and routing table.

9. The iSCSI/SAS router of claim 1, wherein the iSCSI target device is connected to the plurality of ISCSI interfaces via a TCP/IP network.

10. The iSCSI/SAS router of claim 1, wherein the SAS host device is directly connected to the plurality of SAS interfaces.

11. The system of claim 7, wherein the plurality of iSCSI interfaces comprises RJ-45 ports or Ethernet ports.

12. The system of claim 7, wherein the plurality of SAS interfaces comprises wide/narrow ports.

13. The system of claim 7, wherein the SAS host device is directly connected to the plurality of SAS interfaces.

14. The method of claim 5, wherein the plurality of iSCSI interfaces comprises RJ-45 ports or Ethernet ports.

15. The method of claim 5, wherein the plurality of SAS interfaces comprises wide/narrow ports.

* * * * *